(12) United States Patent  
Larue (10) Patent No.: US 7,766,550 B2
(45) Date of Patent: Aug. 3, 2010

(54) CENTERING MECHANISMS FOR TURBOCHARGER BEARINGS

(75) Inventor: Gerald D. Larue, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/536,710

(22) Filed: Aug. 6, 2009

(65) Prior Publication Data

US 2009/0297082 A1   Dec. 3, 2009

Related U.S. Application Data

(62) Division of application No. 11/281,735, filed on Nov. 16, 2005, now abandoned.

(51) Int. Cl.
*F16C 32/06* (2006.01)
*F16C 27/00* (2006.01)

(52) U.S. Cl. .................................. 384/119; 384/215

(58) Field of Classification Search .................. 384/99, 384/100, 103, 104, 106, 119, 124, 148, 185, 384/186, 215, 252, 257, 441, 510, 535–537, 384/558, 559, 581, 611, 617, 620, 903, 904; 415/229; 417/407; 267/164
See application file for complete search history.

(56) References Cited

U.S. PATENT DOCUMENTS

| 3,601,459 | A | * | 8/1971 | Cutting | 384/100 |
| 5,921,683 | A | * | 7/1999 | Merritt et al. | 384/106 |
| 6,424,066 | B1 | * | 7/2002 | Watson et al. | 310/90 |
| 7,648,280 | B2 | * | 1/2010 | Struziak et al. | 384/106 |

* cited by examiner

*Primary Examiner*—Thomas R Hannon
*Assistant Examiner*—James Pilkington
(74) *Attorney, Agent, or Firm*—Brian Pangrle (57) ABSTRACT

An exemplary spring for positioning a turbocharger bearing in a housing includes a free standing inner diameter, a free standing outer diameter and a substantially sinusoidal shape to provide an inward radial bias and to provide an outward radial bias wherein the spring balances the inward radial bias with the outward radial bias to thereby position a turbocharger bearing in a housing. Various exemplary springs, bearings, housings, assemblies, etc., are also disclosed.

9 Claims, 11 Drawing Sheets

Fig. 13

CENTERING MECHANISMS FOR TURBOCHARGER BEARINGS

RELATED APPLICATIONS

This application is a divisional of U.S. patent application Ser. No. 11/281,735, filed on Nov. 16, 2005 now abandoned, which is incorporated by reference herein.

TECHNICAL FIELD

Subject matter disclosed herein relates generally to turbomachinery for internal combustion engines and, in particular, bearings and components for use with bearings.

BACKGROUND

Advantages associated with low friction rotor bearings are well known in the field of turbomachinery where rotor speeds often exceed 100,000 RPM. Such high-speed applications, owing to the fact that rotor imbalance force increases as a square function of rotor speed, typically include a mechanism for radial damping of the rotor bearing. In addition, changes in operating conditions can generate significant axial thrust forces that act on a bearing; these forces should also be damped or absorbed.

One type of low friction bearing is referred to as a fully floating bearing. Fully floating bearings rely on hydrodynamic films, in particular, an inner hydrodynamic film or films between the rotor shaft and the bearing and an outer hydrodynamic film or films between the bearing and the housing. Fully floating bearings can spin in the housing, typically, at between about 20 and about 40 percent of the rotor shaft speed. However, floating bearings can become unstable due to resonant frequencies in the shaft/bearing system driven by such rotation. To prevent such instabilities a semi-floating approach has been used.

In a cylindrical coordinate system, a bearing may be defined with respect to radial, azimuthal and axial coordinates (e.g., r, $\Theta$, z, respectively). See, e.g., Beyer, W. H., *CRC Standard Mathematical Tables*, 28th ed. Boca Raton, Fla.: CRC Press, p. 212, 1987. Within a bearing housing, referred to as housing in subsequent text, a semi-floating bearing is normally located axially and azimuthally via one or more mechanisms. To prevent rotation (i.e., spinning in $\Theta$), a semi-floating bearing may employ a radial pin locating mechanism. Such a mechanism allows some movement in a radial direction along a radial line defined by the pin but prevents rotation of the bearing in the housing. While such a radial pin may provide for axial positioning as well, thrust forces can cause wear and misalignment issues; hence, other mechanisms are sometimes used for axial positioning (e.g., a pin oriented with its axis parallel to that of the bearing and fit into a notch in the end of the bearing).

Overall, an industry need exists for bearing and bearing components housings that allow for better alignment and/or reduced wear. Various exemplary bearings, bearing components and housings presented herein address such issues.

SUMMARY

An exemplary spring for positioning a turbocharger bearing in a housing includes a free standing inner diameter, a free standing outer diameter and a substantially sinusoidal shape to provide an inward radial bias and to provide an outward radial bias wherein the spring balances the inward radial bias with the outward radial bias to thereby position a turbocharger bearing in a housing. Various exemplary springs, bearings, housings, assemblies, etc., are also disclosed.

BRIEF DESCRIPTION OF THE DRAWINGS

A more complete understanding of the various methods, devices, systems, arrangements, etc., described herein, and equivalents thereof, may be had by reference to the following detailed description when taken in conjunction with the accompanying drawings wherein.

DETAILED DESCRIPTION

Various exemplary methods, devices, systems, arrangements, etc., disclosed herein address issues related to technology associated with turbochargers and are optionally suitable for use with electrically assisted turbochargers.

Figure 1A:
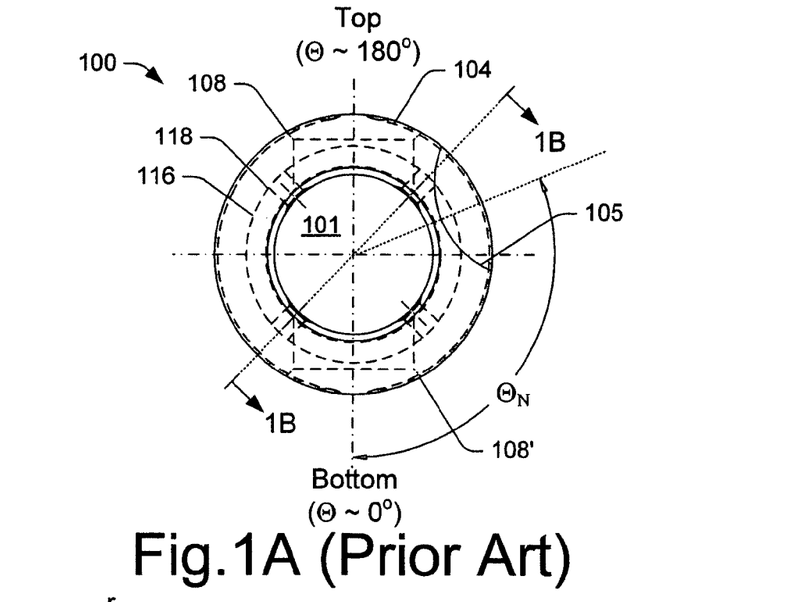
FIG. 1A is an end view of a prior art bearing for a turbocharger.

For various drawings, a cylindrical coordinate system is used for reference that includes radial (r), axial (x) and azimuthal ($\Theta$) dimensions. FIG. 1A shows an end view of prior art bearing 100, i.e., viewed in the r-$\Theta$ plane, where dashed lines represent various structural features. FIG. 1A also indicates a cross-section 1B, which identifies the cross-section of the view of FIG. 1B.

The bearing 100 includes a central bore 101 and various features that allow lubricant to flow to and from the bore 101. The bearing 100 includes a pair of outer annular grooves or grind reliefs 104, 104' to promote lubricant flow. The grooves 104, 104' are referenced to define a center section 106, a first outer section 110 and a second outer section 110'.

The center section 106 of the bearing 100 includes a top opening 108 and a bottom opening 108'. The openings 108, 108' are disposed axially between the annular grooves 104, 104'. Lubricant typically enters the bearing 100 from the top opening 108 and drains from the bottom opening 108'.

Each of the outer sections 110, 110' includes a respective annular channel 116, 116'. Each of the annular channels 116, 116' directs lubricant to a plurality of openings 118, 118'. The openings 118, 118' allow lubricant to lubricate inner journals 120, 120', respectively. Where the bottom opening 108' resides at about 0°, the openings 118, 118' are positioned at about 45°, 135°, 215° and 305°.

The bearing 100 further includes an end notch 105, which has a semi-circular section defined by a radius. The notch 105 is centered at an angle $\Theta_N$ (e.g., about 112°) as measured from the bottom opening 108'.

Figure 1B:
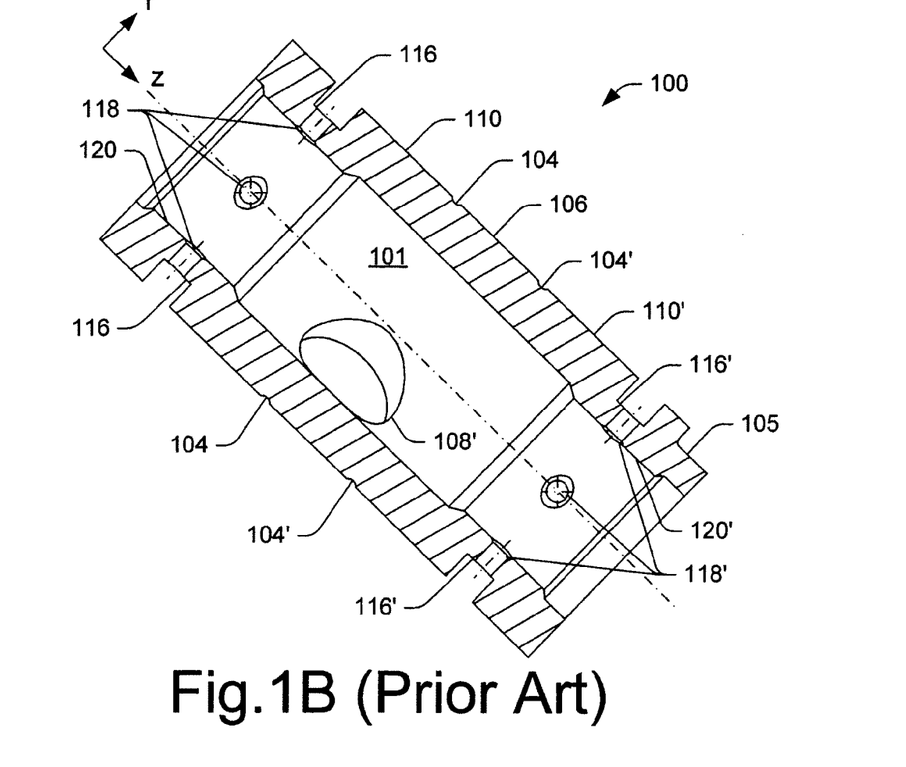
FIG. 1B is a cross-sectional view of a prior art bearing in a prior art housing.
Figure 1C:
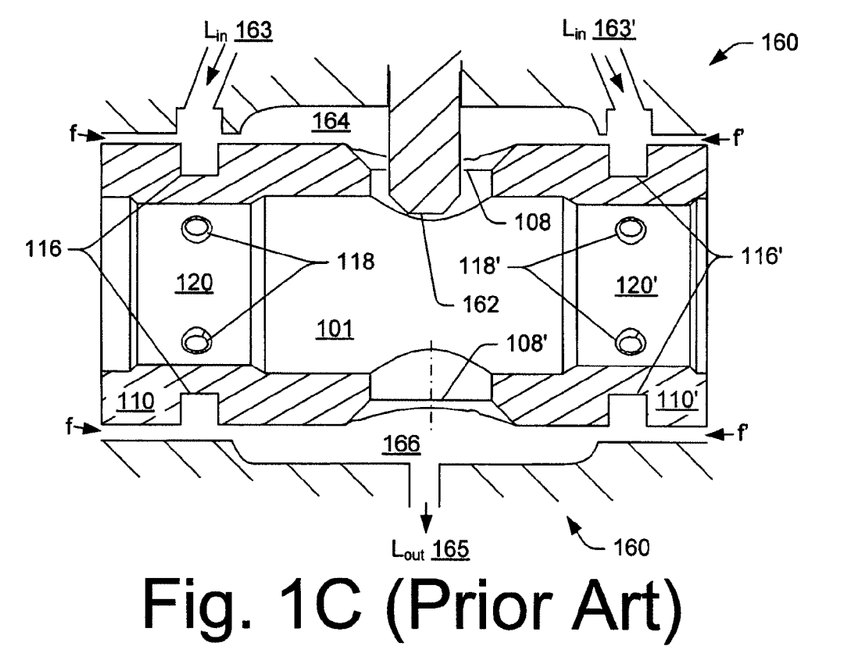
FIG. 1C is a cross-sectional view of a prior art bearing in a prior art housing.

FIG. 1C shows a cross-sectional view of the prior art bearing 100 in a housing 160. In this semi-floating bearing system, a radial pin 162 helps to position and prevent rotation of the bearing 100. More specifically, the pin 162 acts to locate the bearing 100 axially and azimuthally while allowing freedom in the radial direction along the radial line of the pin 162. Axial thrust load along the z-axis causes force to be transmitted from the bearing 100 to the housing 160 via the pin 162. As the pin allows for radial movement, some small amount of clearance exists between the outer diameter of the pin 162 and the inner diameter of the opening 108. Consequently, during operation thrust may cause axial movement of the cartridge with respect to the housing. Such movement can contribute to wear and misalignment.

As described herein, lubricant may be oil such as an engine oil. With respect to lubricant flow, the housing 160 includes lubricant inlets 163, 163' that direct lubricant toward the channels 116, 116' of the bearing 100. The housing 160 includes an upper recess that, in conjunction with the bearing 100, forms an upper chamber 164 that typically fills with lubricant during operation. The housing 160 also includes a lower recess that, in conjunction with the bearing 100, forms a lower chamber 166 adjacent to a lubricant outlet 135 defined by the housing 160. In such an arrangement, lubricant flows from the inlets 163, 163' to various regions (e.g., channels 116, 116', chambers 164, 166, etc.) and then to the outlet 165. In addition, some small amount of lubricant may exits via small clearances between the ends of the bearing 100 and the housing 160. In general, the lower chamber 166 is substantially isolated from the upper chamber 164 to better direct lubricant to the inner journals 120, 120'. To achieve such isolation, the chambers 164, 166 can have any of a variety of shapes, which are not explicitly shown in FIG. 1C or 1D (see, e.g., conventional center housings).

Thus, in the arrangement of FIG. 1C, supplied lubricant flows from the inlets 163, 163' to the annular channels 116, 116' to the openings 118, 118' and to the journal surfaces 120, 120' of the bearing 100. When a shaft is presented, lubricant films are formed between the journal surfaces 120, 120' and the outer surface of the shaft where each lubricant film has a thickness determined by the diameter of a respective journal surface 120, 120' and an outer diameter of the shaft.

Lubricant films are also formed between the bearing 100 and the housing 160. In particular, films f, f' are formed between the outer sections 110, 110' of the bearing 100 and the bore walls of the housing 160. The films f, f' act to dampen motion of the bearing 100 in the housing 160. However, damping effectiveness of the films f, f' varies as the bearing 100 moves in the bore of the housing 160. In particular, the thickness of the films f, f' varies as the bearing moves in the housing 160. Sometimes, the thickness of such films is referred to as the squeeze film thickness.

Figure 1D:
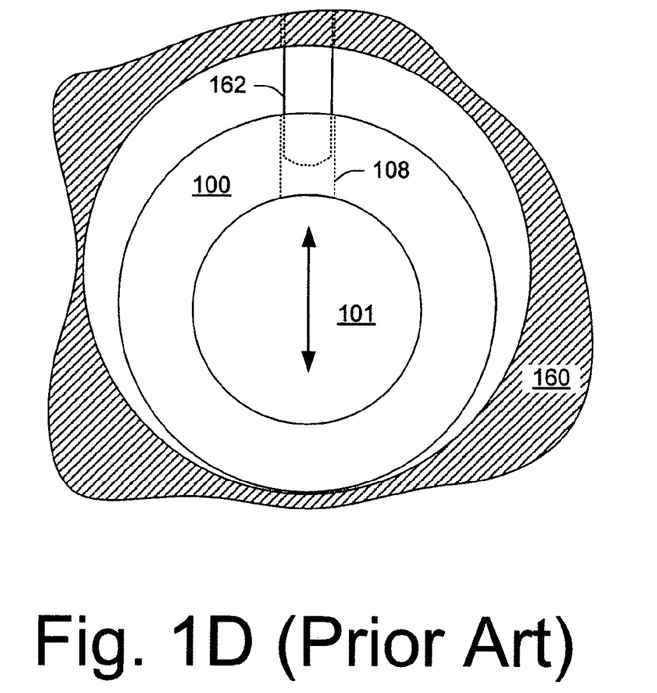
FIG. 1D is an end view of a prior art bearing in a prior art housing.

FIG. 1D is an end view of the prior art bearing 100 in the prior art housing 160. As already explained, the radial pin 162 cooperates with the opening 108. However, given the nature of the pin 162 and the opening 108, a high degree of eccentricity may exist between the housing 160 and the bearing 100. Consequently, lubricant films that form between the housing 160 and the bearing 100 may become uneven as the bearing nutates or rests in the housing.

With respect to an at rest state, the weight of the rotor assembly (e.g., turbine, compressor wheel, shaft, etc.) causes the bearing to rest against the housing bore at essentially 100% eccentricity. Only upon dynamic motion does the bearing "pump up" (i.e., pressurize) the squeeze films that then move the bearing towards the center of the housing bore. If this action does not occur correctly, large motion or damage to the bearing can occur. This problem is particularly important for larger turbochargers owing to the manner in which rotor weight scales versus other parameters.

As discussed herein, various exemplary bearings or related components (e.g., springs, housings, etc.) address primarily bearing/housing films (outer hydrodynamic films) as opposed to the aforementioned bearing/shaft films (inner hydrodynamic films).

As mentioned in the Background, other prior art bearings include fully floating bearings where the bearing is allowed to spin in the housing bore. Such fully floating bearings can experience similar issues as the aforementioned semi-floating bearings (e.g., eccentric lubricant films). Various exemplary technologies discussed herein introduce one or more positioning mechanisms that can address various issues associated with prior art semi-floating and fully floating bearings.

Figure 2:
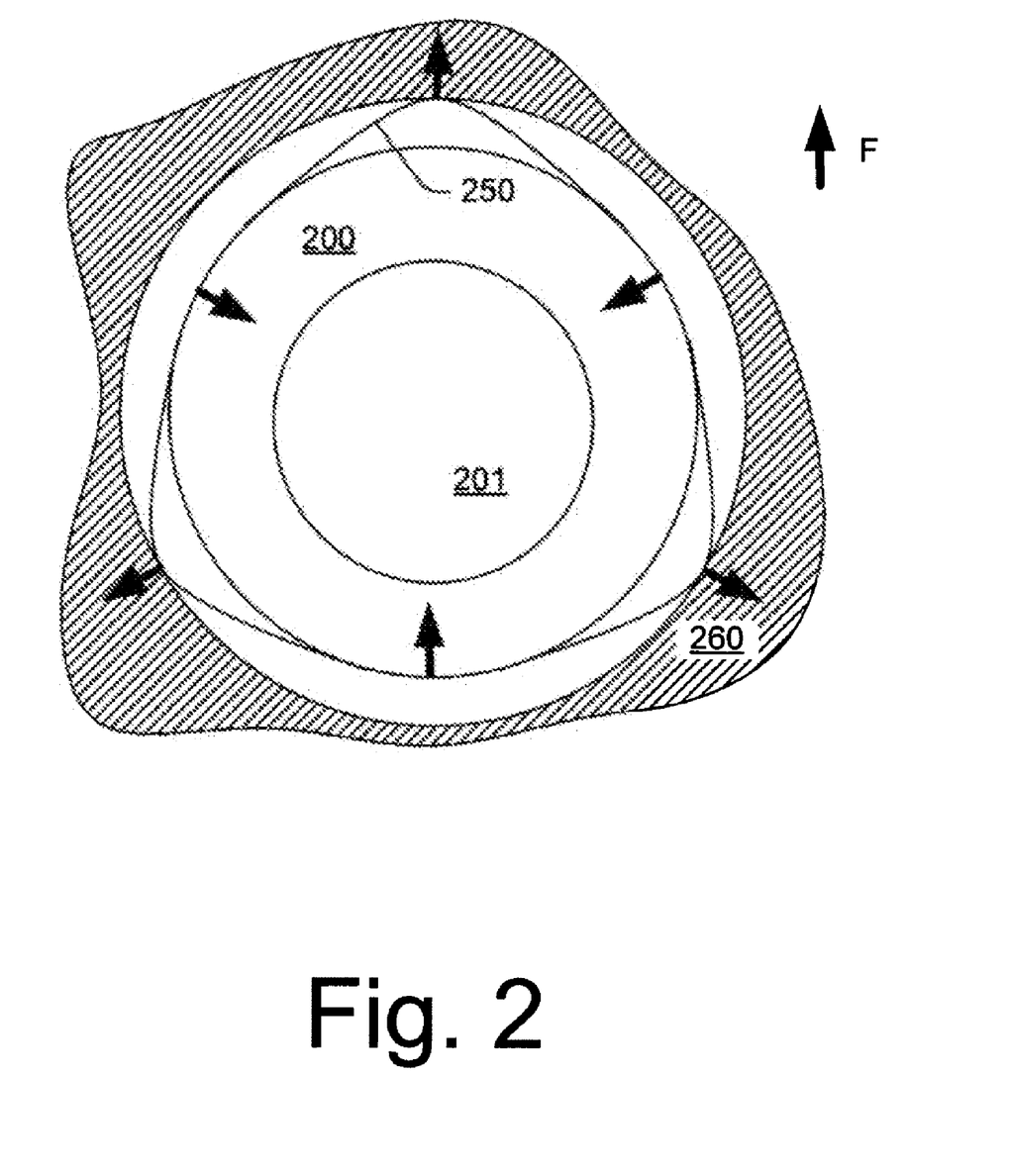
FIG. 2 is an end view of an exemplary assembly that includes a bearing positioned in a housing via an exemplary spring.

Various exemplary technologies presented herein allow for better centering of a bearing in a housing and, consequently, formation of a more even bearing/housing film or films. FIG. 2 shows an end view of a bearing 200 that relies on an exemplary spring 250 to locate the bearing 200 with respect to the housing 260. In this example, a radial locating pin is not required, hence, the housing 260 does not require features associated with the pin of the housing 160 of FIG. 1B. Thus, the spring 250 allows for use of a housing having fewer features.

As indicated by arrows, the spring 250 balances an inward radial bias with an outward radial bias to position the bearing 200 in the housing 260. More specifically, the arrows indicate directions of force exerted by the spring 250 to the bearing 200 and to the housing 260. Such forces are sometimes referred to herein as radial support forces. Depending on the nature of the spring 250 (e.g., spring constant, thickness, fixation mechanism, etc.), when used in a turbocharger assembly, it may be capable of substantially centering the bearing 200 in the housing 260 even when the turbocharger shaft is at rest.

An exemplary spring optionally provides a low spring rate centering force to keep the bearing near the center of the bore of the housing under the weight of the rotor assembly. Thus, the spring rate may be purposely kept as low as possible to avoid increasing the overall rotor assembly support stiffness which can have a detrimental impact on shaft motion characteristics. Further, in this example, dynamic forces can generate the hydrodynamic squeeze film to produce the desirable damping characteristics of a standard semi-floating bearing.

In general, the spring 250 acts to maintain a more even film thickness between the bearing 200 and the housing 260 (e.g., through radial support forces). Further, spring 250 provides resistance to flow of lubricant. Consider an example that includes two springs 250 positioned near the ends of the bearing 200. In this example, the springs 250 hinders axial flow of lubricant from the bearing/housing film. Such a mechanism can help prevent undesirable levels of lubricant leakage at the ends of the bearing. Yet further, the spring 250 can help prevent rotation of a bearing (e.g., via frictional forces between the spring(s) and the bearing and frictional forces between the spring(s) and the housing). Spring 250 is typically preloaded against the bearing and the housing bore and optionally preloaded with a force sufficient to avoid or reduce contact between the bearing 200 bearing and the housing 260.

Figure 3:
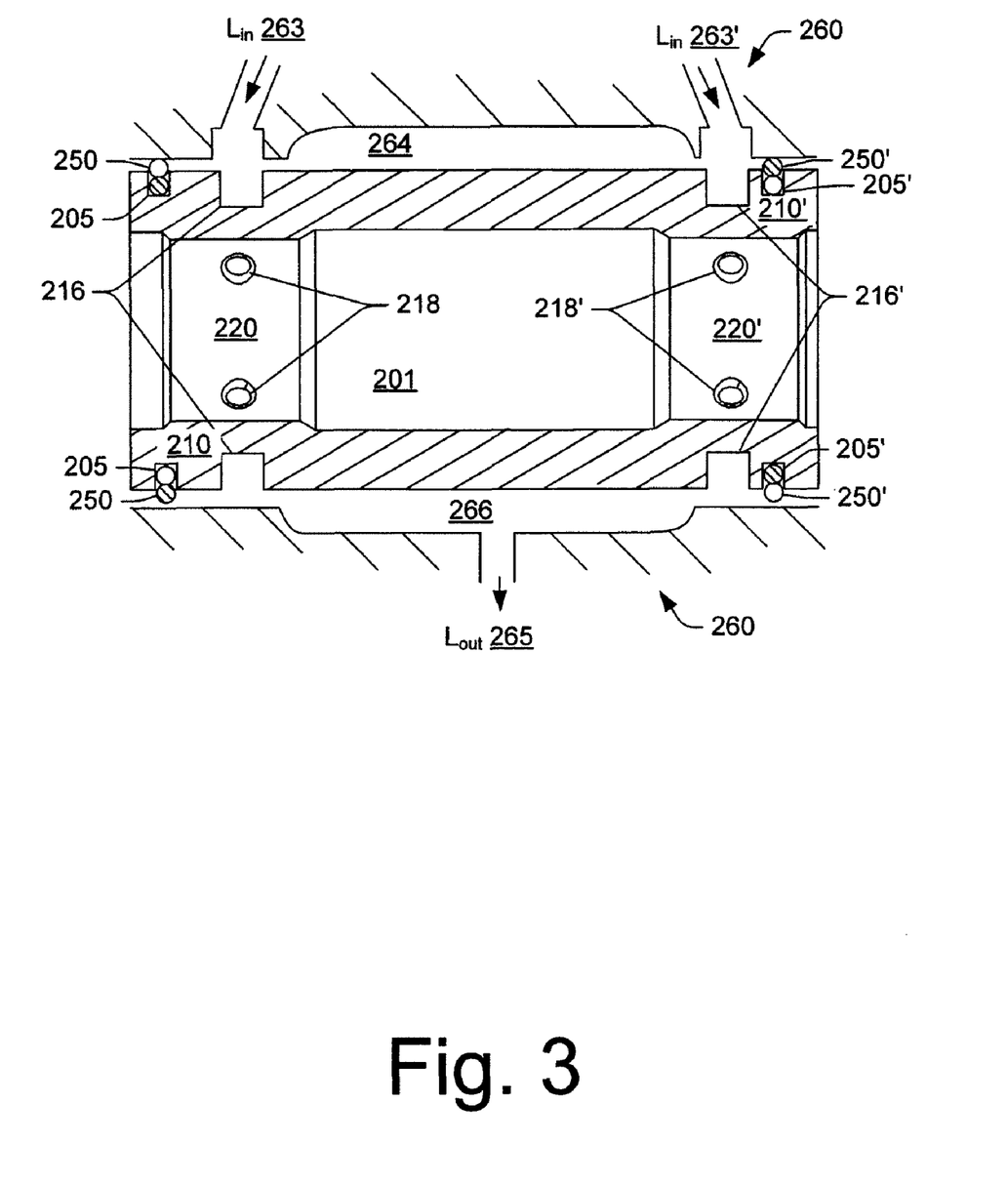
FIG. 3 is a cross-sectional view of an exemplary assembly that includes a bearing positioned in a housing via two exemplary springs.

FIG. 3 shows a cross-sectional view of an exemplary assembly whereby springs 250, 250' position bearing 200 in a bore of a housing 260. In this example, the bearing 250 has annular grooves 205, 205' to seat the springs 250, 250', respectively. In this cross-sectional view, the springs 250, 250' may be oriented in any of a variety of manner with respect to the bearing 200 or the housing 260, as indicated by open and shaded circles for the springs 250, 250'.

As shown in FIG. 3, lubricant inlets 263, 263' open near the channels 216, 216', respectively. A chamber 264 exists along a central section of the housing 260; however, in this example, no pin is required and hence the housing 260 does not include features to accommodate a locating pin. A lower chamber 266 exists along a central section of the housing 260 and adjacent a lubricant outlet 265. The bearing 200 does not require a bottom opening such as the opening 108' of the bearing 100. The chambers 264, 266 may extend azimuthally but are, in general, only connected by small clearances between the housing 260 and the bearing 200. Further, the inlets 263, 263' and the outlet 265 may be located at positions other than those shown in the figures. A housing may have fewer or more inlets or outlets.

With respect to the annular channels 216, 216' and the openings 218, 218' these may differ, for example, as shown in other drawings. In general, openings exist to allow lubricant to lubricate the journals 220, 220' and thereby form one or more bearing/shaft films.

With respect to dimensions, a specific example uses a spring 250 with a diameter of about 1 mm. In this example, a groove 205 of the bearing 200 has an axial length about twice that of the spring diameter (e.g., about 2 mm). These particular specifications may be used for a bearing having an axial length of about 30 mm and an outer diameter of about 14 mm. Such a bearing may have an inner diameter (e.g., central bore 201) of about 8.5 mm.

Figure 4:
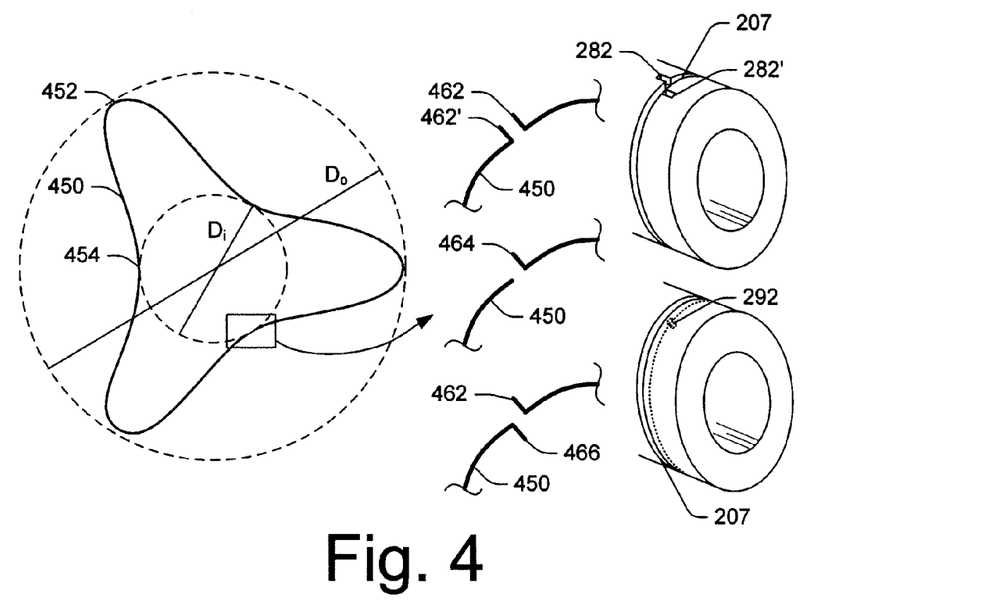
FIG. 4 is a diagram of an exemplary spring, exemplary spring tangs and exemplary bearing features that cooperate with a spring.

FIG. 4 shows an exemplary spring 450 and various other features. Spring 450 is substantially planar, however, a spring may optionally includes at least part of a spiral (e.g., axial displacement or axial span). Spring 450 can be defined, in part, by a free inner diameter ($D_i$) and a free outer diameter ($D_o$). The exemplary spring 450 can be defined, in part, by one or more outer points 452 and one or more inner points 454. In the example of FIG. 4, the spring 450 has three inner points at the free standing inner diameter $D_i$ and three outer points at the free standing outer diameter $D_o$. The spring 450 is sometimes referred to herein as a three-lobed spring that has a substantially smooth variation between inner and outer points (e.g., sinusoid).

In general, when spring 450 is fitted to a bearing the one or more inner points contact the bearing. Positioned in a bore of a housing, the one or more outer points contact the housing. In such an assembly, spring 450 biases the bearing toward the axial center of the bore.

Spring 450 optionally includes one or more tangs. Various exemplary tangs are shown. Tangs 462, 462' are oriented in substantially the same direction (e.g., perpendicular to a plane defined by the spring 450, in the plane, etc.). A single tang 464 may be oriented in any of a variety of manners. Opposing tangs 462, 466 are typically oriented perpendicular to a plane defined by the spring 450 and in opposite directions.

Exemplary bearing features are also shown in FIG. 4. These features cooperate with one or more of the aforementioned tangs. For example, a groove 207 may include notches 282, 282' to accept one or more axially oriented tang. Of course, a bearing may include only one of the notches 282, 282'. In another example, a groove 207 includes a radial notch 292 that may accept a radially directed tang. A bearing may include a combination of such notch features, which may be oriented axially, radially or at angles to thereby properly accommodate one or more tangs.

A spring may have a circular, elliptical or rectangular cross section. Further, the shape of the cross-section may be selected to provide a desired stiffness. For example, a rectangular cross-section will have slightly higher stiffness than a circular cross-section given the same material of construction and approximately same cross-sectional area. However, in some instances, a circular cross-section can provide for easier positioning on a bearing and/or positioning into the bore (e.g., consider that a circular cross-section may reduce sliding friction compared to a square cross-section).

Figure 5:
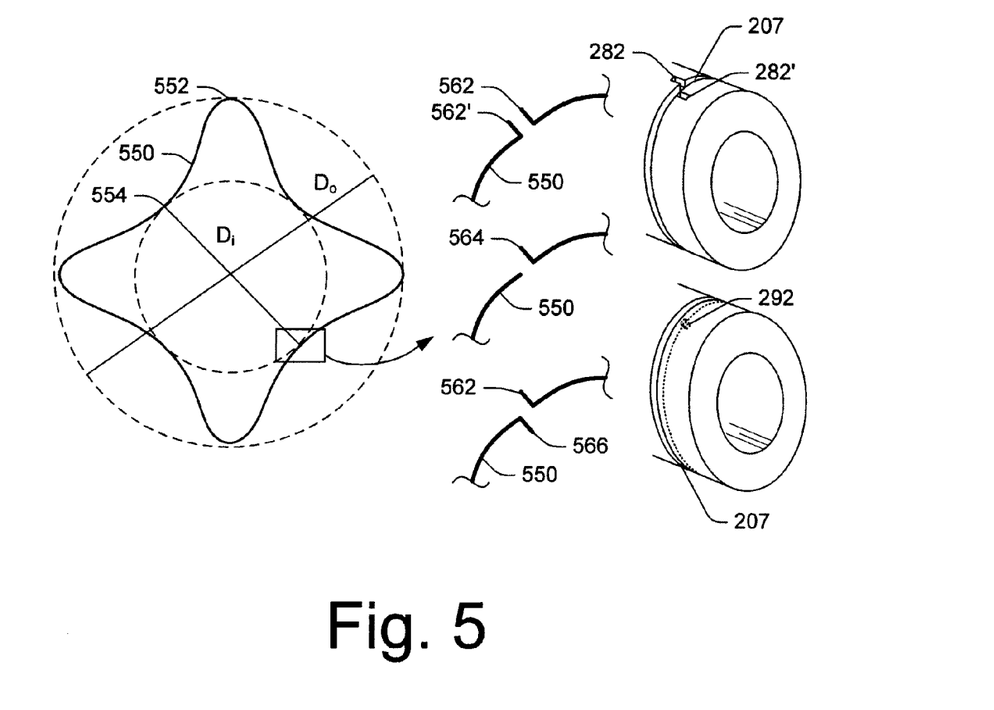
FIG. 5 is a diagram of an exemplary spring, exemplary spring tangs and exemplary bearing features that cooperate with a spring.

FIG. 5 shows an exemplary spring 550 and various other features. Spring 550 is substantially planar, however, a spring may optionally includes at least part of a spiral. Spring 550 can be defined, in part, by a free standing inner diameter ($D_i$) and a free standing outer diameter ($D_o$). In the example of FIG. 5, spring 550 has four inner points at the free standing inner diameter $D_i$ and four outer points at the free standing outer diameter $D_o$. Spring 550 is sometimes referred to herein as a four-lobed spring that has a substantially smooth variation between inner and outer points (e.g., sinusoid). Of course, springs with more lobes are possible (e.g., 5, 6, etc.).

In general, when spring 550 is fitted to a bearing the one or more inner points contact the bearing and one or more outer points contact the housing. In such an assembly, the exemplary spring 550 biases the bearing toward the axial center of the housing. Spring 550 optionally includes one or more tangs, for example, similar to those described with respect to FIG. 4. Exemplary bearing features are also shown in FIG. 5, which are also similar to those described with reference to FIG. 4.

An exemplary spring may have a shape other than those shown in FIG. 4 and FIG. 5 while still retaining the general biasing concept. In general, the shape allows the spring to bias a bearing within a housing to thereby maintain a more even bearing/housing film thickness(es).

Figure 6:
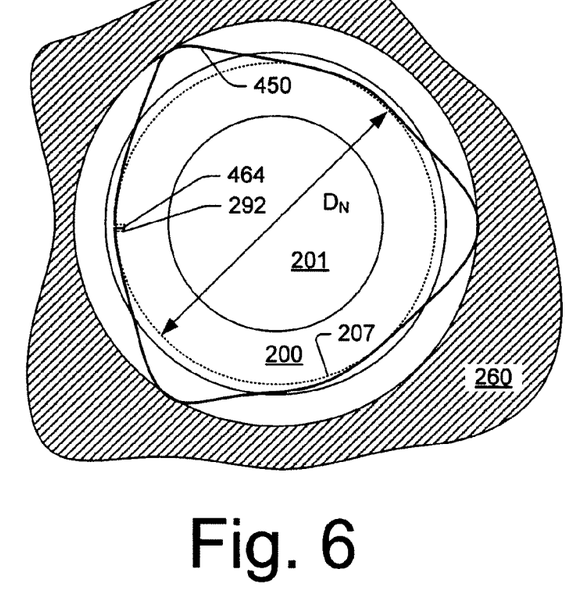
FIG. 6 is an end view of an exemplary assembly that includes the exemplary spring of FIG. 4.

FIG. 6 shows the exemplary spring 450 as part of an assembly that includes a bearing 200 and a housing 260. The bearing 200 includes a groove diameter $D_N$. In general, the aforementioned free standing inner diameter $D_i$ is less than the groove diameter $D_N$. When the spring 450 is fitted to the bearing 200, preloading exists whereby the spring 450 biases the bearing 200 away from the walls of the housing. The free standing outer diameter $D_o$, of the spring 450 may change once the spring 450 is fitted to the bearing 200. Further, the outer diameter $D_o$ may exceed the bore diameter of the housing 260. Thus, the spring 450 may be compressed to fit the bearing 200 and spring 450 into the bore of the housing 260.

In this example, the spring 450 includes a tang 464 that is seated in a notch 292 of the bearing 200 whereby the tang 464 and the notch 292 prevent the spring 450 from rotating about the bearing 200.

Figure 7:
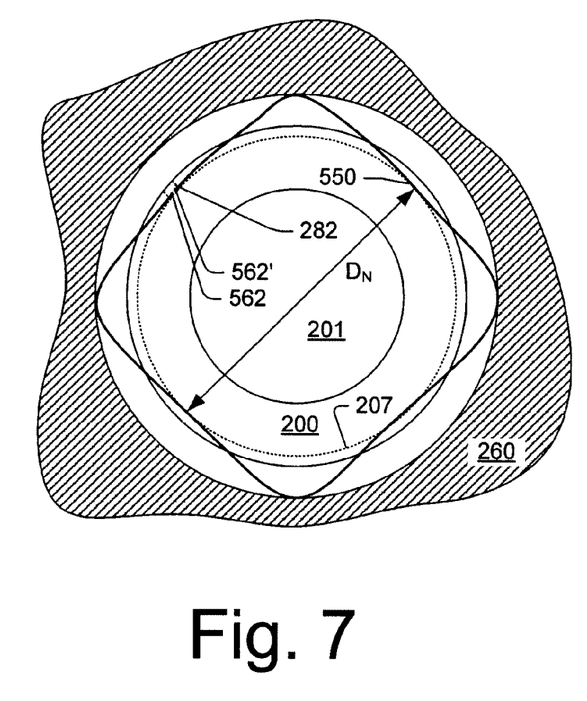
FIG. 7 is an end view of an exemplary assembly that includes the exemplary spring of FIG. 5.

FIG. 7 shows the exemplary spring 550 as part of an exemplary assembly that includes an exemplary bearing 200 and an exemplary housing 260. The features of FIG. 7 are similar to those of FIG. 6 except of course the number of lobes differs.

Figure 8A:
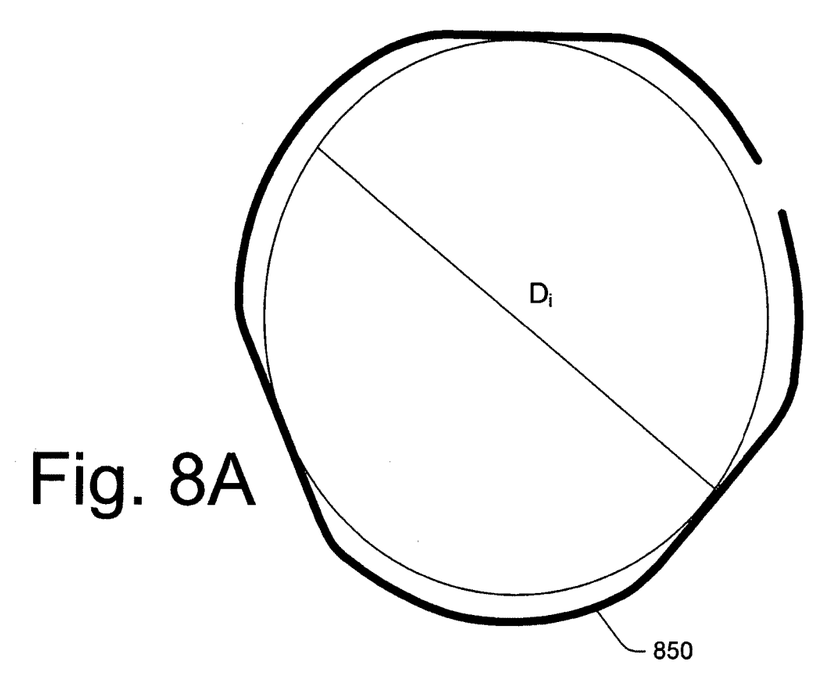
FIG. 8A is a view of another exemplary spring.

FIG. 8A shows another exemplary spring 850 that has a free standing inner diameter $D_i$. A gap exists in the spring 850 to facilitate installation. Such a spring optionally includes one or more tangs. The spring 850 includes several straight sections and several curved sections wherein the straight sections are tangent to $D_i$ and where the curved sections define a maximum diameter greater than $D_i$. In this example, the gap exists along a curved section (e.g., approximately at the midpoint of a curved section). Also, the three straight sections are tangent to the free standing inner diameter at approximately 0°, approximately 120°, and approximately 240°.

Figure 8B:
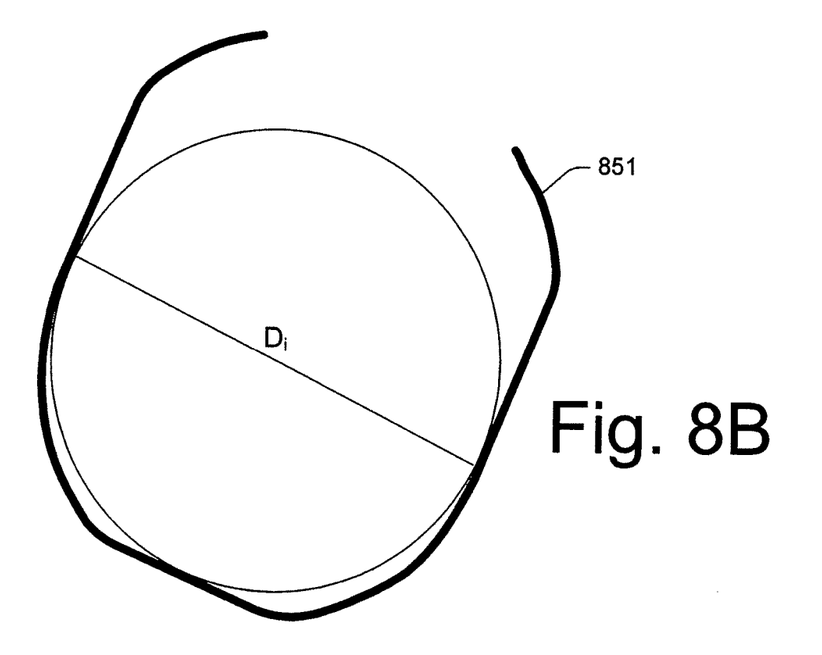
FIG. 8B is a view of yet another exemplary spring.

FIG. 8B shows yet another exemplary spring 851 that has a free standing inner diameter $D_i$. A larger gap exists in the spring 851 that in the spring 850. Ends of the spring 851 are compressed toward the center during installation. In this example, characteristics of the ends (e.g., angle and length) may be adjusted to provide proper biasing of a bearing in a housing. The spring 851 also includes several straight sections and several curved sections. In this example, the straight sections are tangent to $D_i$ at approximately 0°, approximately 90° and approximately 180°.

While a spring may have any suitable spring rate, in one example, a spring has a static spring rate of approximately 2 lb/in (0.35 N/mm) to about 3 lb/in (0.53 N/mm). While a spring may have any suitable cross-section and associated dimension(s), in one example, a spring has a substantially circular cross-section and a diameter of about 0.036 in (1 mm). In one example, a spring with a static spring rate of about 2.8 lb/in (about 0.49 N/mm) and a diameter of about 0.036 in (about 1 mm) exerts a radial force of at least about 37 lb (about 165 N) to resist torque. Other examples are possible and may depend on features of a bearing, a housing, etc., and/or one or more operational conditions (e.g., steady-state operation, transient operation, rotational speed, etc.).

An exemplary spring lies substantially in a plane (i.e., a substantially planar spring) and is suitable for positioning a turbocharger bearing in a housing. Such a spring may include a first end and a second end and a free standing inner diameter. As shown in FIGS. 8A and 8B, such a spring may have a plurality of straight sections tangent to a free standing inner diameter and disposed between a first end and a second end wherein the straight sections provide an inward radial bias. As shown in FIGS. 2, 4, 5, 6, 7, 8A and 8B, a spring typically has one or more curved sections. For example, in FIGS. 8A and 8B, the springs include at least one curved section disposed between two of the straight sections to provide an outward radial bias. Regardless of the number of straight sections and/or curved sections, a spring typically balances an inward radial bias with an outward radial bias to thereby position a bearing in a housing. Where a free end exists, such an end may provide an outward radial bias.

In an assembly, an exemplary spring may be seated in a annular groove or notch. Of course, partial grooves or notches are possible, for example, three separate grooves disposed at approximately 0°, approximately 120°, and approximately 240° may be used to seat the spring 850 of FIG. 8A. In general, a groove has a diameter or radius that exceeds the free standing inner diameter or radius of a spring.

An exemplary spring optionally includes one or more tangs. Such a tang or tangs may extend outward from a plane of a spring or lie in a plane of a spring.

Figure 9:
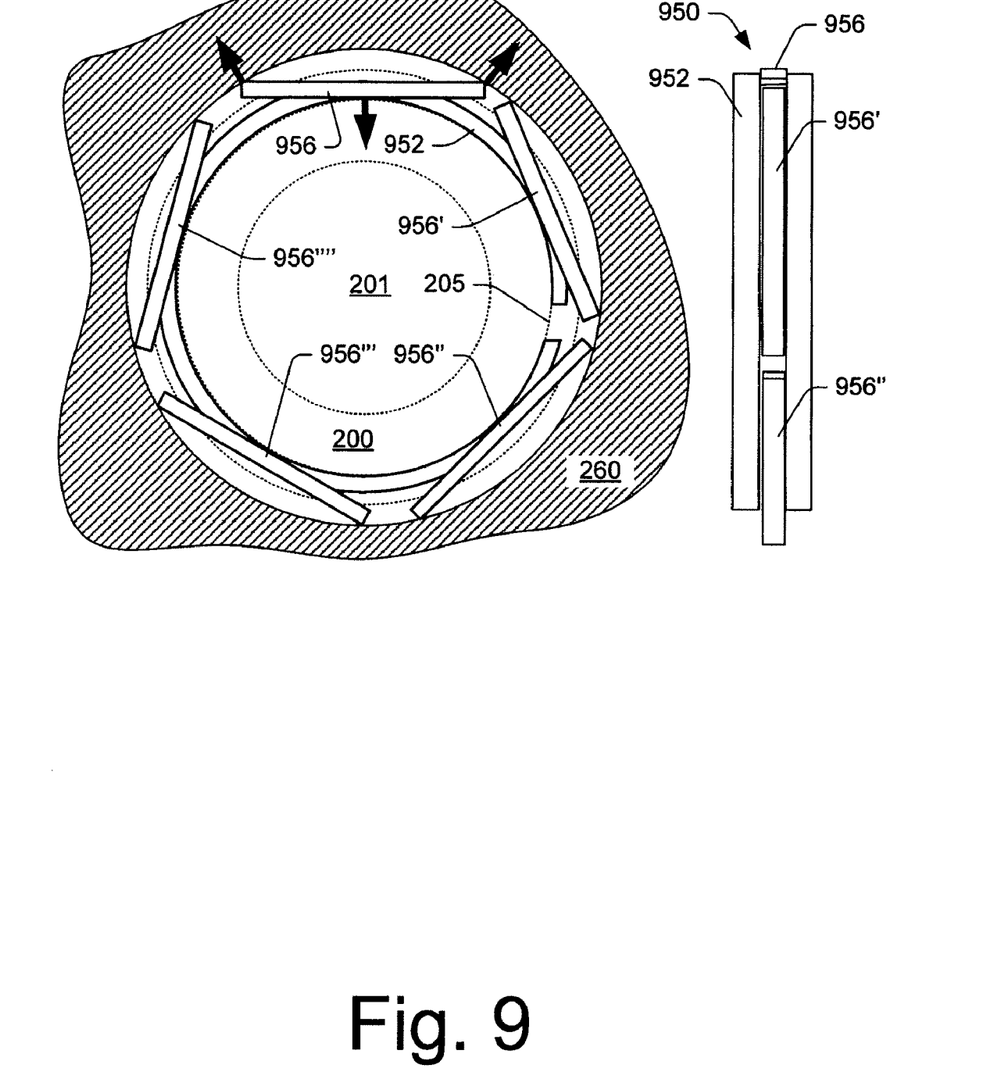
FIG. 9 is an end view of an exemplary assembly that includes an exemplary spring mechanism and a side view of the exemplary spring mechanism.

FIG. 9 shows an end view and a side view of another exemplary spring 950 where the end view shows the spring 950 as part of an assembly that includes a bearing 200 and a housing 260. As shown in the side view, the spring 950 includes a ring member 952 that is machined or otherwise formed to create one or more tabs 956, 956', 956". The ring member 952 is optionally split to allow for installation on a bearing and/or to bias a bearing. With respect to machining, a rolling die is optionally used to cut slots into the ring member 952 to thereby form the tabs.

As shown in the end view, the spring 950 is positioned in a groove or end notch 205 of the bearing 200 where the spring has five tabs 956, 956', 956", 956", 956". These tabs bias the bearing 200 and the housing 260 as indicated by force arrows. As with other exemplary springs discussed herein, material of construction is typically metal or alloy; however, other materials may suffice given constraints associated with operating conditions of a turbocharger.

An exemplary spring includes a thin sheet metal ring with formed cantilever tangs to provide spring action. In such an example, where tangs are formed in alternating directions, the spring is capable of operating correctly regardless of orientation. Such a spring can provide a "camming action" that resists bearing torque and thereby help frictional forces prevent rotation.

Figure 10:
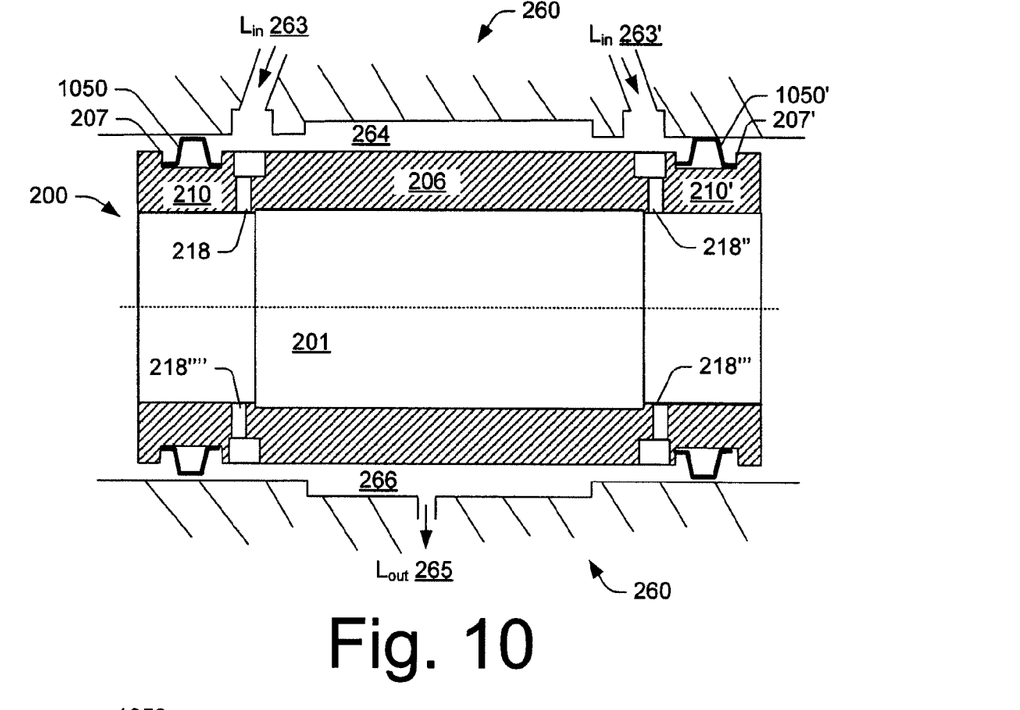
FIG. 10 is a cross-sectional view of an exemplary assembly that includes a bearing positioned in a housing via two exemplary cylindrical rings.

FIG. 10 shows an exemplary assembly that includes a bearing 200, a housing 260 and a pair of exemplary cylindrical rings 1050, 1050'. The cylindrical rings 1050 provide for centering of the bearing 200 in the housing 260. In this example, the pair of cylindrical rings 1050, 1050' sit in a pair of annular notches 207, 207' in the outer sections 210, 210' of the bearing 200. Various features of the housing 260 are the same or similar to those described with respect to the housing 260 of FIG. 3.

The cylindrical rings 1050, 1050 may be or include features of commercially available tolerance rings (e.g., tolerance rings marketed by Rencol Tolerance Rings, Bristol, UK). Such tolerance rings are often made from spring steel, stainless steel and other specialist spring materials. A tolerance ring can be a frictional fastener capable of handling direct torque transfer, torque slip, axial retention, controlled collapse and radial loading between mating components. Peaks and valleys or waves act as radial springs and may be described by a spring formula: $F=k\Delta r$, where F is the force (e.g., N), k is the spring rate (e.g., Nm) and $\Delta r$ is a radial distance by which a wave is compressed. Peak and valley shapes as well as material of construction and treatments can alter properties such as spring rate for a particular application.

Figure 11A:
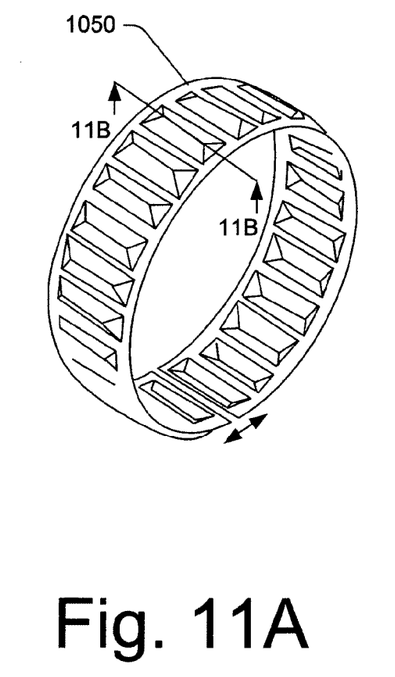
FIG. 11A is a perspective view of an exemplary cylindrical ring of the assembly of FIG. 10.

FIG. 11A shows a perspective view of the exemplary cylindrical ring 1050. The exemplary cylindrical ring 1050 is split to allow for installation. The cylindrical ring 1050 may be manufactured by feeding a material to a rotating gear-like mechanism that deforms the material to form ridges and valleys. The material may be metal, alloy or other material. The cylindrical ring 1050 acts to position the bearing 200 in the housing 260 in a semi-floating manner. The cylindrical ring 1050 acts to resist lubricant flow axially toward the ends of the bearing 200.

In the example of FIG. 10, the cylindrical rings 1050, 1050' have a diameter approximately equal to the diameter of the annular notches 207, 207'. Overlap may occur whereby a peak sits in a valley; alternatively, a gap may exist once fitted to a bearing.

Figure 11B:
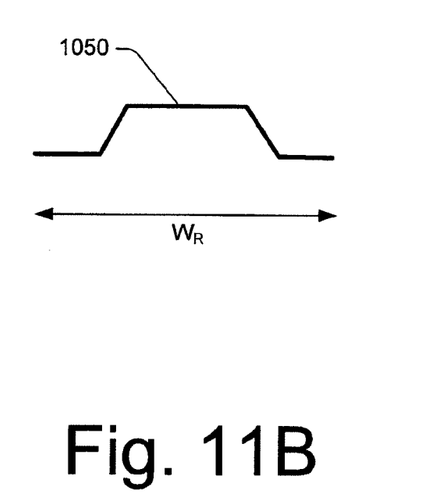
FIG. 11B is a cross-sectional view of the exemplary cylindrical ring of FIG. 11A.

FIG. 11B shows a cross-sectional view of the exemplary cylindrical ring 1050 along the line 11B-11B of FIG. 11A. The cylindrical ring 1050 has a ring width WA, a height, a rise profile and a thickness. The dimensions may vary to provide a specific clearance between a bearing and a housing (i.e., a bearing/housing clearance). A specific example has a ring width $W_R$ of about 2 mm to about 3 mm. Such an exemplary ring may be fitted to a bearing having a notch width of about 2 mm to about 3 mm.

An assembly may optionally include an exemplary mesh ring fitted to a bearing. A mesh ring may be formed of wire where the wire may be metal and/or other material. Commercially available knitted mesh materials such as the METEX® (Metex Corporation; New Jersey, USA) knitted mesh materials may be suitable for use as a mesh ring for a bearing as described herein. For example, METEX® knitted mesh consists of wires of various metals or strands of other materials that have been knitted into a mesh structure. Structures of compressed knitted metal mesh yield to shock or vibration stresses but resume their original form when the force is relieved. Thus, a mesh ring may be resilient and capable of slight expansion for fitting to a bearing and compression for inserting such a bearing into the bore of a housing.

Figure 12:
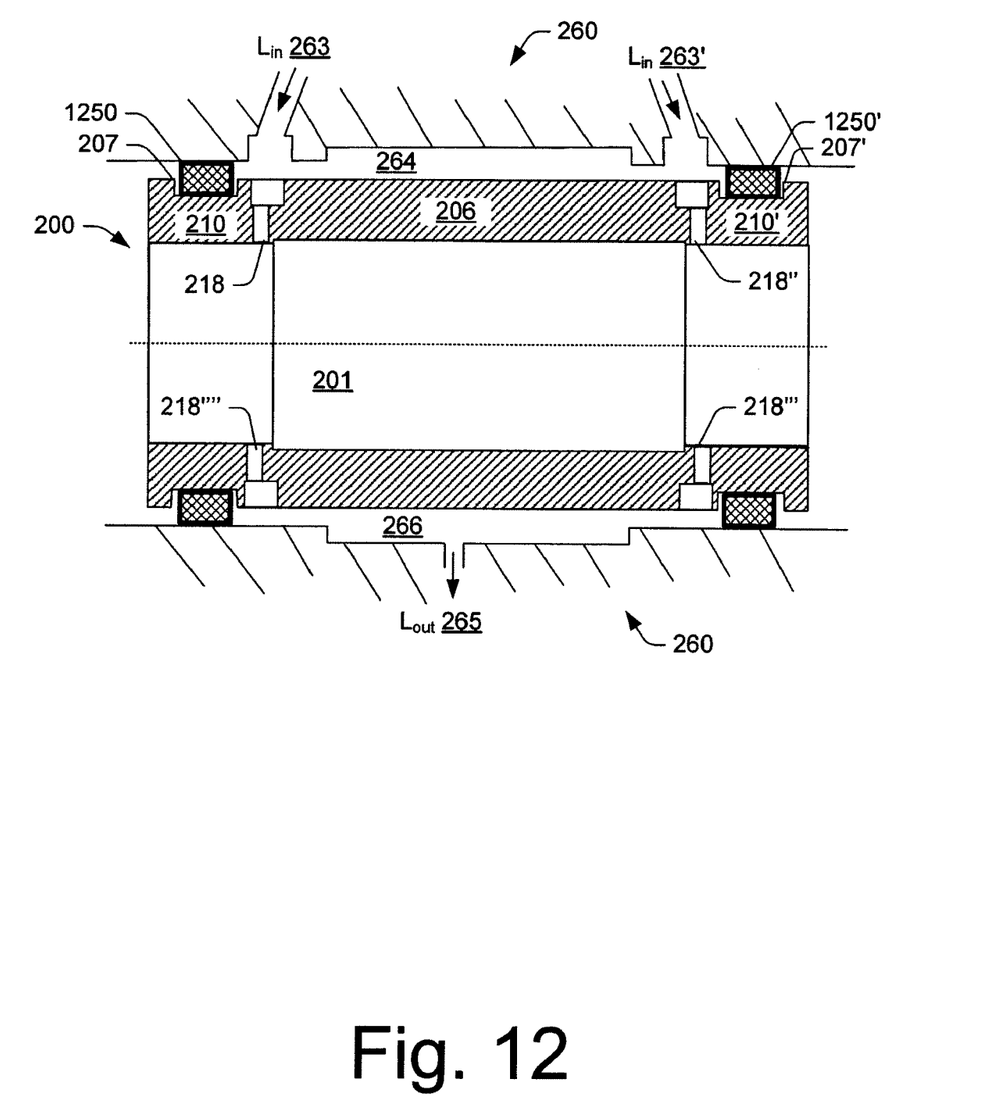
FIG. 12 is a cross-sectional view of an exemplary assembly that includes a bearing positioned in a housing via two exemplary mesh rings.

FIG. 12 shows the assembly of FIG. 10 where the rings 1050, 1050' are replaced with mesh rings 1250, 1250'. An exemplary mesh ring optionally has a rectangular cross-section similar to a piston ring suitable for use with a turbocharger center housing/bearing assembly. Other cross-sections are possible as well (e.g., circular, oval, etc.). In such an assembly, a mesh ring can provide support to the bearing and shaft for centering without providing the majority of the stiffness and damping support. Further, such a ring can resist outward lubricant flow, which as described above, may cause leakage at the ends of a housing/bearing assembly.

An exemplary assembly optionally includes one or more of the exemplary positioning mechanisms discussed herein (e.g., springs and cylindrical rings, a spring and a mesh ring, etc.).

Figure 13:
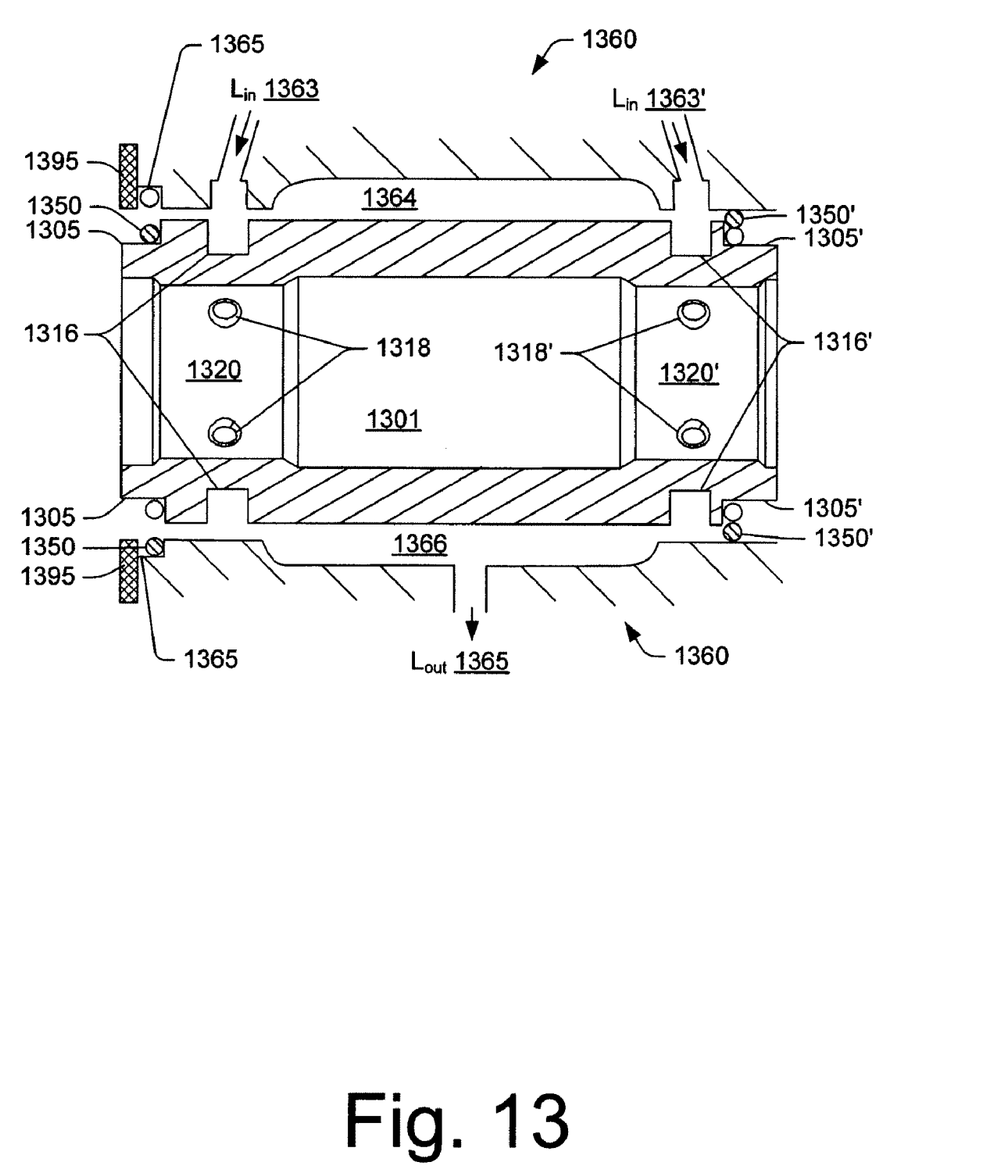
FIG. 13 is a cross-sectional view of an exemplary assembly that includes a bearing positioned in a housing via exemplary springs that aid in axial positioning of the bearing in the housing.

Various exemplary positioning mechanisms optionally operate to position a bearing axially. FIG. 13 shows an exemplary assembly that includes a bearing 1300 in the bore of a housing 1360. The bearing 1300 includes various features as already discussed such as a bore 1301, channels 1316, 1316', openings 1318-1318'''', etc. The housing 1360 includes various features as already discussed such as one or more lubricant inlets 1363, 1363', one or more lubricant outlets 1365, etc. However, for purposes of axial position, the housing 1360 includes an annular notch 1365 and an associated annular plate 1395 or plate(s). In this example, the spring 1350 is at least partially seated in the notch 1365 and retaining mechanism 1395 to thereby limit axial movement of the bearing 1300 in the housing 1360. Shear stress in such an example is acceptable for the spring 1350. Further, the characteristics of the spring 1350' may differ from some of those of the spring 1350. For example, the spring 1350 may optionally have a larger outer diameter than that of the spring 1350' or the spring 1350 may be thicker (e.g., a larger gauge) than the spring 1350'. The assembly optionally includes retaining mechanisms at both ends of the bearing and housing assembly.

Although some exemplary methods, devices, systems arrangements, etc., have been illustrated in the accompanying Drawings and described in the foregoing Detailed Description, it will be understood that the exemplary embodiments disclosed are not limiting, but are capable of numerous rearrangements, modifications and substitutions without departing from the spirit set forth and defined by the following claims.

What is claimed is:

1. An assembly comprising:
   a turbocharger center housing that comprises a bore;
   a turbocharger bearing wherein the turbocharger bearing comprises an annular groove and a notch wherein the annular groove comprises a diameter; and
   a substantially planar spring, seated at least partially in the annular groove for positioning the turbocharger bearing in the bore of the housing, wherein the spring comprises
   a free standing inner diameter,
   a free standing outer diameter,
   a tang seated at least partially in the notch for preventing rotation of the spring about the turbocharger bearing;
   a substantially sinusoidal shape to provide an inward radial bias at contact points between the spring and the bearing and to provide an outward radial bias at contact points between the spring and a housing wherein the spring balances the inward radial bias with the outward radial bias to reduce contact between the bearing and the housing and variation in a squeeze film thickness and
   wherein the diameter of the annular groove of the bearing exceeds the free standing inner diameter of the spring.

2. The assembly of claim 1 wherein the tang of the spring further comprises one or more straight sections.

3. The assembly of claim 1 wherein the sinusoidal shape comprises three or more lobes.

4. The assembly of claim 1 wherein the bearing comprises another annular groove for seating, at least partially, another substantially planar spring and wherein the bearing comprises another notch for seating, at least partially, a tang of the other spring.

5. The assembly of claim 1 wherein the notch extends to the annular groove.

6. The assembly of claim 1 wherein the notch comprises an axial length that extends axially to the annular groove.

7. The assembly of claim 1 wherein the notch comprises a radial length that extends radially to the annular groove.

8. The assembly of claim 1 wherein the bearing comprises two notches and wherein the spring comprises two tangs.

9. The assembly of claim 1 wherein the turbocharger center housing comprises an annular groove to seat, at least partially, the spring.

* * * * *

UNITED STATES PATENT AND TRADEMARK OFFICE
CERTIFICATE OF CORRECTION

| | | |
|---|---|---|
| PATENT NO. | : 7,766,550 B2 | |
| APPLICATION NO. | : 12/536710 | |
| DATED | : August 3, 2010 | |
| INVENTOR(S) | : Gerald D. LaRue | |

It is certified that error appears in the above-identified patent and that said Letters Patent is hereby corrected as shown below:

On the Title page, Item (12), "Larue", should read "LaRue".

On the Title page, Item (75), "Inventor: Gerald D. Larue", should read "Inventor: Gerald D. LaRue".

At col. 2, lines 13-14, the sentence "Fig. 1B is a cross-sectional view of a prior art bearing in a prior art housing." should read: "Fig. 1B is a cross-sectional view of a prior art bearing.".

At col. 3, lines 43-46, in the sentence "The housing 160 also includes a lower recess that, in conjunction with the bearing 100, forms a lower chamber 166 adjacent to a lubricant outlet 135 defined by the housing 160.", the reference numeral 135 should read --165--.

At col. 5, lines 33-34, the sentence "The bearing 200 does not require a bottom opening such as the opening 108' of the bearing 100." should read "The bearing 200 does not require, though can benefit from, a bottom opening such as the opening 108' of the bearing 100."

At col. 8, lines 10-12, in the sentence "As shown in the end view, the spring 950 is positioned in a groove or end notch 205 of the bearing 200 where the spring has five tabs 956, 956', 956", 956", 956".", the last two references numeral should read --956''', 956''''--.

Signed and Sealed this
Twenty-ninth Day of March, 2011

David J. Kappos
*Director of the United States Patent and Trademark Office*